April 7, 1964  A. B. NELSON ETAL  3,128,384
AUTOMATIC ILLUMINATION REGULATING UNIT
Filed Nov. 14, 1958

INVENTORS
Alfred B. Nelson
Richard F. Greene
Owen J. McCabe
BY Johnson and Kline
ATTORNEYS

United States Patent Office 3,128,384
Patented Apr. 7, 1964

3,128,384
AUTOMATIC ILLUMINATION REGULATING UNIT
Alfred B. Nelson, Bristol, Richard F. Greene, Forestville, and Owen J. McCabe, Bristol, Conn., assignors to The Superior Electric Company, Bristol, Conn., a corporation of Connecticut
Filed Nov. 14, 1958, Ser. No. 774,011
7 Claims. (Cl. 250—205)

The present invention relates to an automatic illumination regulating unit that controls the amount of light emitted from an artificial source to maintain substantially constant the total amount of natural and artificial illumination in an area.

While the maintaining of a substantially constant total amount of illumination in an area has heretofore been proposed, by using an automatic unit that varies the amount of light emitted from an artificial source to compensate for changes in the amount of natural light in the area, it has been found difficult to initially set the unit to the level of illumination to be maintained constant. Moreover further difficulty was experienced when it was desired to adjust the illumination level from one value to another which may be desired when the area is to be utilized for different activities with each activity having a different, most effective total illumination level.

It is an object of the present invention to provide an automatic illumination regulating unit that includes a means for visually indicating the total amount of illumination present in the area at all times that the unit is energized.

Another object of the present invention is to provide in a unit of the above type a selecting member for adjusting the total amount of illumination desired to be maintained constant and for employing in conjunction with the selecting member the visible indicating means so that the selecting member may be adjusted while the indicating means is being observed by the person making the adjustment.

A further object of the present invention is to provide an automatic light regulating unit that produces full illumination from the full output of the artificial source when initially switched on, the regulating unit automatically decreasing the light emitted therefrom to cause the total illumination present to be brought to the selected value.

A feature of the present invention resides in providing in a unit of the above type a meter which indicates the total amount of illumination present at all times that the unit is energized, as sensed by a photo-sensitive cell, the meter being a component of the unit, the unit having a sensing circuit that includes the photocell, which produces a signal for controlling the amount of electrical energy supplied to the artificial source. The sensing circuit may include a Wheatstone bridge in which the meter is electrically connected in series with the photocell in one leg of the bridge to be responsive to the current passing therethrough as determined by the cell. Preferably, according to the present invention, the sensing circuit is contained in a small box which may be mounted in the area to be controlled on a wall for instance. The box contains the meter and a selecting knob and means operated thereby for adjusting the value of total illumination which is desired to be maintained constant, but preferably the photocell is separate from the box so that it may be mounted in the best position for sensing the total illumination. By having both the indicating and the selecting means in a single container, an operator can easily observe that value of illumination which is being selected.

A further feature of the present invention resides in a circuit that sets (after the unit is switched off) the artificial source to produce full illumination the next time the unit is energized. This is accomplished by controlling the power to the artificial source as by an autotransformer that is driven by an electric motor and of energizing the motor after switching off the unit to drive the autotransformer to its full output position and then deenergizing the motor. Accordingly, when the unit is again switched on, the artificial source starts at maximum illumination and is then regulated to the amount selected by the automatic regulating unit.

Other features and advantages will hereinafter appear.

Figure 1:
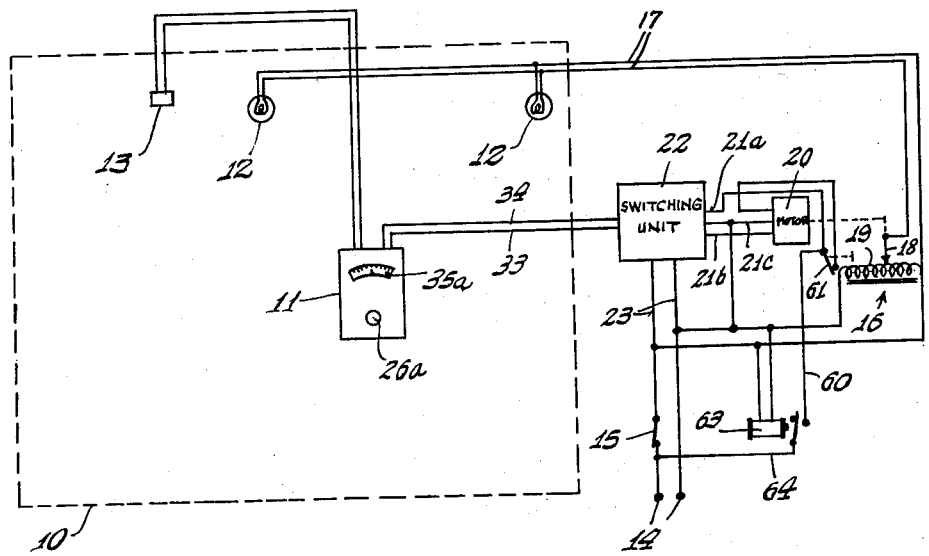
FIGURE 1 is a diagram showing the components of the unit of the present invention in block and schematic form and the manner in which they are interconnected and may be positioned in an area.

Referring to the drawing, the area, such as a room, in which it is desired to maintain substantially constant the total amount of illumination from internal and external sources is indicated within the dotted lines 10, and preferably supported therein on a wall or other convenient means is a control box 11. Also shown is an artificial source of light, such as incandescent electric bulbs 12 and a photocell 13 for sensing the amount of illumination in the area. The photocell is positioned to be responsive to the illumination in the area. The area has openings through which natural or other external light may enter, such as windows, skylights, etc.

The light source 12 is energized from a pair of terminals 14 which are connectible to a source of alternating current and are connected through an on-off switch 15 to the input of an autotransformer 16 with the light source receiving electric current from the output of the autotransformer by the leads 17. The autotransformer has a winding 19 on which is mechanically moved a brush 18 by a reversible electric motor 20 (as for example the type disclosed in U.S. Patent 2,589,999). The motor is energized by leads 21a, 21b and 21c which are connected to a switching unit 22 with the latter being connected to the control box 11. Energy from the terminals 14 to the switching unit and control box is through a pair of leads 23.

It will be appreciated that when the switch 15 is closed, that the photocell 13 senses the total amount of illumination present in the area, and causes the sensing circuit to produce a signal for the switching unit that serves to cause energization of the electric motor 20 to adjust the position of the brush 18 on the winding 19 to control the amount of energy to the light source 12, thereby regulating the light emitted therefrom to maintain the total value of illumination in the area constant.

To permit the value of the total illumination in the area from both the light source 12 and natural or other external light entering the area to be varied to an optimum value considering the activities to be carried on in the area at any given time, the present invention provides means associated with the photocell 13 and manually operable means for controlling the energization of the light source 12 whereby the total illumination of the area may be substantially instantaneously brought to optimum value as shown by a light meter positioned with respect to the manually operable means for varying the output of the light source 12 so that the light meter can be read while the manually operable means is being adjusted.

Figure 2:
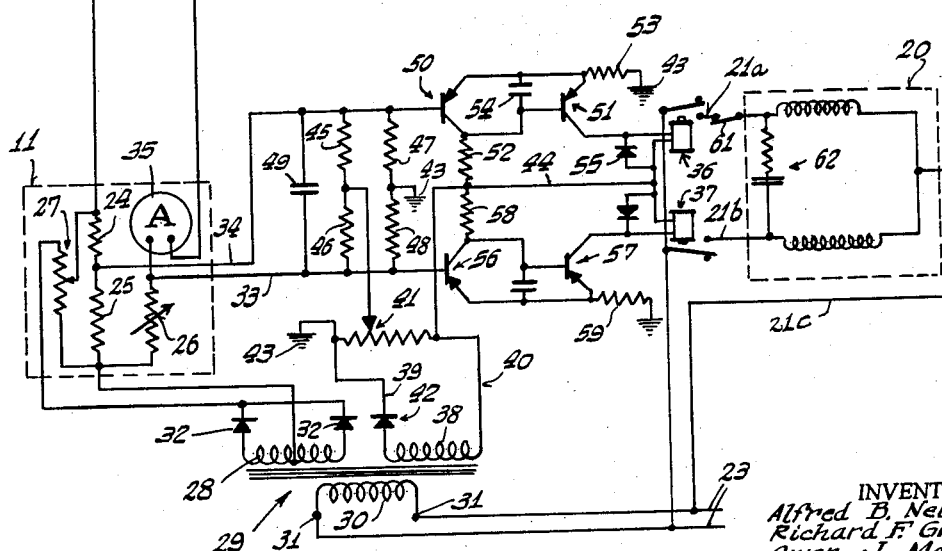
FIG. 2 is an electrical schematic diagram of the sensing and switching unit.

Referring to FIG. 2, the control box 11 is indicated by dotted lines and this box physically contains the sensing circuit of the automatic light regulating unit of the present invention. The sensing circuit consists in the specific embodiment shown, of a Wheatstone bridge having resistances 24 and 25 in one pair of adjacent legs, a variable resistance 26 and the photocell 13 in the other pair of adjacent legs. The bridge is energized with unidirectional current through a potentiometer 27 which is connected to a center tapped winding 28 of a transformer 29 having a primary winding 30 connected to terminals 31 which are energized from a source of alternating current as by the leads 23. One-way valves 32 provide for unidirectional energization of the bridge. The signal from the bridge which may be of either polarity is led through a pair of leads 33 and 34.

In the bridge, the value of resistances 24 and 25 is substantially equal, while the variable resistance 26 has a range which includes this value. The cell 13 has a resistance to the passage of current therethrough which depends upon the light striking it; however its range of resistance includes the above-noted value. The variable resistance 26 enables adjusting the bridge to balance at different values of conductance of the photocell 13 and thereby is employed to select the amount of total illumination which is to be maintained constant. The resistance is mounted in the control box 11 and is manually operable by means of a knob 26a which is positioned on the exterior of the box 11. Thus, under an operating condition when the amount of total illumination in the area as sensed by the cell 13 is equal to that selected by the variable resistance 26, the bridge is balanced and there is no signal produced by the bridge. The potentiometer 27 provides for adjusting the voltage to the bridge to set the rate of magnitude of the signal and to compensate for differences between photocells.

It will be appreciated that upon energization of the bridge a current flows through the leg containing the cell 13 whether or not the bridge is balanced. In order to provide a visible indication of the amount of total illumination present in the area, the present invention incorporates a milliammeter 35 in the leg of the bridge which contains the cell 13. Thus the meter by being in the same leg with the cell 13 is responsive to changes in the conductance of the cell and since this conductance is altered by the total amount of illumination present in the area, the meter 35 accordingly indicates the total value of illumination since it measures the current through the cell. The face 35a of the meter is visible through a cutout in the control box 11 and is calibrated in footcandles.

The switching unit 22 receives the signal in the leads 33 and 34 from the bridge and employs this signal to cause energization of either a relay 36 or a relay 37, these relays being electrically connected to the motor 20, enabling energizing of it. Since the polarity of the signal changes depending on the deviation of the total amount of illumination from the selected value, there is provided one path for operating the relay 36 when the signal has one polarity and another path for operating the relay 37 when the signal has the other polarity, these paths being substantially identical.

The transformer 30 has a winding 38 connected by leads 39 and 40 to a potentiometer 41. A one-way valve 42 causes unidirectional energization to provide a common positive ground 43 and a common negative lead 44. Connected between the leads 33 and 34 is a bridge having adjacent legs containing resistances 45 and 46 and another pair of adjacent legs having resistances 47 and 48. A filter condenser 49 is also connected across the leads. The tap of the potentiometer 41 is connected to the junction of the resistances 45 and 46, while the junction of the resistances 47 and 48 is connected to the positive ground 43.

In the path for operating relay 36 to energize the motor to increase the power to the bulbs 12 there is provided two PNP transistors 50 and 51. The base of the transistor 50 is connected to the junction of the resistances 45 and 47 and its collector is connected to the common negative lead 44 through a resistance 52. The base of the transistor 51 is connected to the collector of the transistor 50 while its collector is connected through the winding of the relay 36 to the common negative lead 44. The emitters of the transistors are connected in parallel to the positive ground 43 through a resistor 53. There is also included a condenser 54 connected across the base and emitter of the transistor 51 and a one-way valve 55 connected across the relay 36.

The path for energizing the relay 37 similarly includes two transistors 56 and 57 and resistances 58 and 59 which are connected like the transistors 50 and 51 and resistances 52 and 53, respectively. The elements of the second path are interconnected in the same manner as that explained above for the relay 36 except the base of the transistor 56 is connected to the junction of the resistances 46 and 48 in order to render the path receptive to a signal having a reverse polarity.

The relays 36 and 37 are connected to a source of electrical energy through the leads 23 and in relay 36 for example, as shown in FIG. 2, a lead 21a connects through a switch 61 to the up winding of the motor 20 while the relay 37 connects one of the leads 23 through lead 21b to in-phase energize the down winding of the motor. A phase changing means 62 is positioned between the two windings to cause out-of-phase energization thereof.

In the operation of the unit, presupposing that the selector knob 26a which adjusts the variable resistor 26 has been set at a predetermined value of total illumination in the area and that there is that same value of illumination in the area, the photocell 13 has a conductance which causes the bridge to be balanced so that no current or voltage appears across the leads 33, 33 even though there is current through the cell 13 and meter 35. Upon a decrease of total illumination, the cell 13 decreases in conductance which lowers the current through the cell 13 and makes the lead 34 positive with respect to the lead 33. Conversely upon an increase of illumination, the lead 33 becomes positive with respect to the lead 34 as the conductance of the cell 13 increases and more current passes through the cell 13 and meter 35. The meter 35 by being positioned in the leg containing the cell accordingly indicates the current through the cell and hence at all times that the sensing circuit is energized indicates the value of total illumination in the area as sensed by the cell 13.

In the switching unit, the transistor 50 is normally (i.e. when the bridge is balanced) fully conducting in the emitter-collector circuit by reason of the potential across the emitter-base circuit, this latter including the resistances 53, 45 and the tap of the potentiometer 41 which makes the base sufficiently negative with respect to the emitter to make the emitter-collector circuit of the transistor 50 substantially fully conductive. The emitter-base circuit of the transistor 51 is in parallel with the emitter-collector circuit of the transistor 50 and in view of the transistor 50 having relatively no resistance because it is fully conducting in the emitter-collector circuit there is little current flowing through the emitter-base circuit of the transistor 51 and hence there is substantially no current flowing through the emitter-collector circuit of the transistor 51. Accordingly the relay 36 is not energized.

Upon the lead 34 becoming positive with respect to the lead 33, a positive voltage appears at the base of the transistor 50 which decreases the potential across the emitter-base circuit and lowers the conductance through its emitter-collector circuit. As this conductance decreases, the emitter-base circuit of the transistor 51 has increasing current through it which decreases the resistance in the emitter-collector circuit and, at a threshold point, the current through the emitter-collector circuit of transistor 51 becomes of a value sufficient to energize the relay 36 to close the same. This causes in-phase energization of the upfield winding of the motor and out-of-phase energization of the downfield winding, which rotates the motor to move the brush on the winding 18 and increase the power to the bulbs 12 to thereby raise the light emitted therefrom to maintain the total illumination in the area substantially constant.

As soon as this value of total illumination is approximately reached, the bridge becomes balanced with no potential across the leads 33 and 34. This increases the potential across the emitter-base circuit of the transistor 50 which increases the conductance in its emitter-collector circuit which causes a decrease in the current through the emitter-base circuit of transistor 51 rendering it substantially nonconductive in its emitter-collector circuit thereby deenergizing the relay 36.

Conversely, if the lead 33 is positive with respect to the lead 34 which occurs when the total illumination in the area exceeds the desired value the conductance in the emitter-collector circuit of transistor 56 decreases which causes an increase in the current through the emitter-base circuit of the transistor 57 causing current to flow through the emitter-collector circuit of this transistor thereby energizing the relay 37. The closing of the relay 37 energizes the down winding of the motor 20 with in-phase voltage and the up winding with out-of-phase voltage to cause the motor to drive the brush to decrease the current to the bulbs 12 thereby decreasing the total value of illumination.

The diodes 55 across the windings of the relays 36 and 37 are employed to shunt the back E.M.F. developed across these windings through the windings again. Since the energization thereof is only half wave, thus these diodes prevent "buzzing" of the relays.

The setting of the potentiometer 41 determines the voltage across the emitter-base circuit of the transistors 50 and 56. As this potential is increased, the sensitivity of the triggering circuit is decreased and vice versa and accordingly this potentiometer determines the sensitivity and the range that the total illumination may vary from the set value before the light from the bulbs is changed.

The present invention further provides for the initial switching on of the bulbs 12 at their full value of illumination independently of the automatic regulating of the light therefrom, thereby obviating waiting while the automatic illumination regulating unit increases the illumination from the bulbs to an acceptable usable level.

To this end, there is provided a relay 63 connected to the terminals 14 through the manually operable switch 15. The relay 63 is normally closed and when the switch 15 is closed it becomes energized to be opened. When energized, there is no conduction through the terminals of the relay; however when deenergized, current flows through a lead 64 to a lead 60 and through the switch 61 and lead 21a to the up winding of the motor to drive the brush to produce a maximum output power. The switch 61 is of the normally closed type and is positioned in the path of travel of the brush 18 to be operated thereby when the brush reaches its upper end of travel. Upon opening of the switch 61 by the brush 18 at maximum output, the up winding becomes deenergized and the brush stops in this position. Upon operation of the manually operable switch 15 to produce illumination from the bulbs 12, the initial illumination therefrom will be at its maximum. However, immediately the sensing unit takes over control of the motor since the relay 63 becomes energized, breaking the connection between the leads 60 and 64.

It will accordingly be appreciated that there has been disclosed a novel automatic lighting regulating unit which maintains the total illumination in an area at a constant value by controlling a portion of the total illumination that is derived from an artificial source in the area. The invention provides for adjusting the value of total illumination desired to be maintained and for an indicating means which indicates the total illumination therein. Both the adjusting means and the indicating means are components of the unit and are mounted in a single box that may be positioned in the area or remote therefrom to enable reading of the meter while adjusting the knob 26a to vary the total amount of illumination that is to be maintained constant. In addition the invention provides for the use of a single photocell that is mounted to be responsive to the total illumination in the area, the photocell having a variable correlated to and alterable by the amount of total illumination received by it, and the effects produced by this variable are used to control the regulating means and are also measured by the indicating meter to indicate the total amount of illumination. Thus one photocell controls the regulating means and also provides for the meter indicating the amount of total illumination in the area.

Variations and modifications may be made within the scope of the claims and portions of the improvements may be used without others.

We claim:

1. An automatic light regulating unit for maintaining substantially constant a selected value of total illumination in an area which may be illuminated by a source of artificial light and natural light, comprising means for energizing the light source, control means for controlling the amount of energy transmitted to the light source and hence the amount of illumination emitted therefrom, sensing means for producing a signal for regulating the control means, a switch for energizing and deenergizing the unit and means connected to the control means for causing said means to be set upon deenergization of the unit to transmit the maximum amount of energy to the light source when the unit is next energized.

2. An automatic light regulating unit for maintaining substantially constant a selected value of total illumination in an area which may be illuminated by a source of artificial light and natural light, comprising means for energizing the light source, control means for controlling the amount of energy transmitted to the light source and hence the amount of illumination emitted therefrom, sensing means for producing a signal for regulating the control means, a switch for energizing and deenergizing the unit and means connected to the control means for causing said means to be positioned upon deenergization of the unit to transmit the maximum amount of energy to the light source when the unit is next energized, said last-named means including a relay connected to the control means for energizing same upon deenergization of the unit.

3. An automatic light regulating unit for maintaining substantially constant a selected value of total illumination in an area which may be illuminated by a source of artificial light and natural light, comprising means for energizing the light source, control means including an adjustable autotransformer having a brush and having its output connected to the light source and a reversible electric motor for moving the brush for controlling the amount of energy transmitted to the light source and hence the amount of illumination emitted therefrom, sensing means for producing a signal for regulating the control means, a switch for energizing and deenergizing the unit, a relay, connections between the relay and the motor for energizing the motor when the relay is deenergized, connections between the relay and the switch for energizing the relay when the switch is in the unit energizing position to prevent energizing the motor through the relay and a normally closed switch electrically connected between the relay and the motor and positioned to be operated by the brush when the output of the autotransformer is set for maximum output whereby said motor is energized upon deenergizing of the unit to set the autotransformer to produce maximum output upon next energization of the unit and the motor is deenergized upon attaining the maximum position.

4. An automatic light regulating unit for maintaining substantially constant a selected value of total illumination in an area which may be illuminated by a source of artificial light and natural light, comprising means for energizing the light source, control means for controlling the amount of energy transmitted to the light source and hence the amount of illumination emitted therefrom, sensing means for producing a signal for regulating the control means, said sensing means including a circuit having a photocell mounted to be responsive to the total illumination in the area and having a variable correlated to and alterable by the amount of total illumination received thereby and an indicating meter for measuring the value of the variable and indicating the value of total illumination in the area, a switch for energizing and deenergizing the unit and means connected to the control means for causing the control means to be energized upon deenergizing of the unit to set the means to transmit the maximum amount of energy to the light source when the unit is next energized.

5. An automatic light regulating unit for maintaining substantially constant a selected value of total illumination in an area which may be illuminated by a source of artificial light and natural light, comprising means for energizing the light source, control means for controlling the amount of energy transmitted to the light source and hence the amount of illumination emitted therefrom, sensing means for producing a signal for regulating the control means, said sensing means including a circuit having a photocell mounted to be responsive to the total illumination in the area and having a variable correlated to and alterable by the amount of total illumination received thereby, an indicating meter for measuring the value of the variable and indicating the value of total illumination in the area, manually operable means for adjusting the value of total illumination which is to be maintained constant, a switch for energizing and deenergizing the unit and means connected to the control means for causing the control means to be energized upon deenergizing of the unit to set the means to transmit the maximum amount of energy to the light source when the unit is next energized.

6. An automatic light regulating unit for maintaining substantially constant a selected value of total illumination in an area which may be illuminated by a source of artificial light and natural light, comprising means for energizing the light source, control means for controlling the amount of energy transmitted to the light source and hence the amount of illumination emitted therefrom, sensing means for producing a signal for regulating the control means, said sensing means including a Wheatstone bridge circuit having a photocell electrically connected in one leg to be responsive to the total illumination in the area and having a conductance correlated to and alterable by the amount of total illumination received thereby, an indicating meter electrically connected in the one leg for measuring the effect of the conductance and indicating the value of total illumination in the area, a variable resistance electrically connected in a different leg for selecting the conductance of the photocell at which the bridge is balanced, a switch for energizing and deenergizing the unit and means connected to the control means for causing the control means to be energized upon deenergizing of the unit to set the means to transmit the maximum amount of energy to the light source when the unit is next energized.

7. A lighting circuit for selecting, indicating and maintaining substantially constant the total illumination in an area comprising a sensing circuit for producing a signal having a polarity indicative of the deviation of the total illumination from a selected value including a Wheatstone bridge, means for energizing the bridge, a light-sensitive element having a variable correlated to the total amount of illumination present in the area positioned in the area to be responsive to said illumination and electrically connected in one leg of the bridge, a variable resistance connected in an adjacent leg of the bridge and being capable of adjusting the bridge to balance at a value of the light-sensitive element which corresponds to the desired value of total illumination and a meter connected in the circuit for indicating the value of total illumination in the area as sensed by the light-sensitive element; a triggering circuit electrically connected to receive the output signal from the bridge including a pair of normally open relays, a relay energizing circuit for each relay, means in each circuit for rendering said circuit operative to energize its relay for a signal of only one polarity with the polarity of the signal rendering one circuit operative being the opposite of the signal rendering the other circuit operative; a reversible electrical motor; a source of electrical energy; connections connecting the source of said motor through one relay which when closed energizes the motor to cause movement in one direction and connecting the source to said motor through the other relay which when closed energizes the motor to cause movement in the other direction; an adjustable autotransformer having an input, an output and an operating shaft, means interconnecting the shaft and motor to cause operation of the autotransformer shaft by the motor; at least one electric lamp positioned to direct light upon the area; and means connecting the lamp to the output of the autotransformer and the input to the source of electrical energy whereby a change in the illumination in the area alters the variable of the photocell to cause the autotransformer to regulate the amount of illumination from the electric lamp thereby maintaining substantially constant the amount of illumination in said area.

References Cited in the file of this patent

UNITED STATES PATENTS

| | | |
|---|---|---|
| Re. 20,823 | Goodwin | Aug. 9, 1938 |
| 1,810,172 | Hayes | June 16, 1931 |
| 2,030,854 | Calver | Feb. 18, 1936 |
| 2,269,324 | Turner et al. | Jan. 6, 1942 |
| 2,346,794 | Seeger et al. | Apr. 18, 1944 |
| 2,573,554 | Dwyer | Oct. 30, 1951 |
| 2,897,720 | Offner | Aug. 4, 1959 |